(12) United States Patent
Jung et al.

(10) Patent No.: US 9,106,337 B2
(45) Date of Patent: Aug. 11, 2015

(54) TERMINAL APPARATUS FOR AUTO PAIRING, REMOTE CONTROL APPARATUS AND METHOD THEREOF

(71) Applicant: SAMSUNG ELECTRONICS CO., LTD., Suwon-si (KR)

(72) Inventors: Kyung-hee Jung, Suwon-si (KR); Geun-sam Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 13/675,575

(22) Filed: Nov. 13, 2012

(65) Prior Publication Data
US 2013/0129358 A1 May 23, 2013

(30) Foreign Application Priority Data
Nov. 23, 2011 (KR) .................. 10-2011-0123235

(51) Int. Cl.
*H04B 10/114* (2013.01)
*G08C 17/02* (2006.01)
(Continued)

(52) U.S. Cl.
CPC ............ *H04B 10/1141* (2013.01); *G08C 17/02* (2013.01); *G08C 23/04* (2013.01); *H04B 10/114* (2013.01); *H04B 10/1149* (2013.01); *H04N 21/42207* (2013.01); *G08C 2201/20* (2013.01); *G08C 2201/61* (2013.01); *G08C 2201/91* (2013.01)

(58) Field of Classification Search
CPC .. G08C 2201/91; G08C 23/04; H04B 10/114; H04B 10/1141; H04B 10/1149
USPC .......................................................... 398/106
See application file for complete search history.

(56) References Cited

U.S. PATENT DOCUMENTS

2008/0157993 A1* 7/2008 Du Breuil et al. ............ 340/825
2008/0253772 A1* 10/2008 Katsuyama ................... 398/106
2010/0302461 A1* 12/2010 Lim et al. ...................... 348/734
(Continued)

FOREIGN PATENT DOCUMENTS

EP        2 262 227 A1    12/2010
JP       2003078475 A      3/2003
(Continued)

OTHER PUBLICATIONS

Communication from the European Patent Office issued Feb. 26, 2013 in counterpart European Application No. 12188311.0.

*Primary Examiner* — Shi K Li
(74) *Attorney, Agent, or Firm* — Sughrue Mion, PLLC (57) ABSTRACT

A terminal apparatus for auto pairing and a remote control apparatus and method thereof are provided. The terminal apparatus includes an IR receiving unit configured to receive an IR signal including first identification information of an external apparatus from the external apparatus, a radio frequency (RF) communication unit configured to perform wireless communication with the external apparatus which transmit the IR signal including the first identification information, a storage unit configured to store a pairing list including identification information of at least one external apparatus, and a control unit configured to control the RF communication unit to perform pairing for wireless communication with the external apparatus according to whether or not identification information of at least one external apparatus in the pairing list corresponds to the received first identification information.

28 Claims, 6 Drawing Sheets

(51) Int. Cl.
  *G08C 23/04*       (2006.01)
  *H04N 21/422*      (2011.01)

(56) References Cited

U.S. PATENT DOCUMENTS

2011/0018754 A1\* 1/2011 Tojima et al. ................. 341/176
2011/0069184 A1\* 3/2011 Go ............................. 348/207.1
2012/0213134 A1\* 8/2012 Woo et al. .................... 370/311
2013/0051806 A1\* 2/2013 Quilici et al. ................. 398/106
2013/0130800 A1\* 5/2013 Sirilux et al. ................... 463/37

FOREIGN PATENT DOCUMENTS

| JP | 2006339806 A | 12/2006 |
| JP | 2009260934 A | 11/2009 |
| KR | 1020080010859 A | 1/2008 |
| KR | 1020080044375 A | 5/2008 |

\* cited by examiner

TERMINAL APPARATUS FOR AUTO PAIRING, REMOTE CONTROL APPARATUS AND METHOD THEREOF

CROSS-REFERENCE TO RELATED APPLICATION

This application claims priority from Korean Patent Application No. 10-2011-0123235, filed on Nov. 23, 2011, in the Korean Intellectual Property Office, the disclosure of which is incorporated herein by reference in its entirety.

BACKGROUND

1. Field

Apparatuses and methods consistent with exemplary embodiments relate to technology for wireless communication between apparatuses, and more particularly, to a terminal apparatus for auto pairing and a remote control apparatus and method thereof which perform auto pairing for wireless communication between the remote control apparatus and a terminal apparatus.

2. Description of the Related Art

In general, Bluetooth is a wireless interface standard for enabling wireless communication between terminal apparatuses which are around about 10 m to about 100 m apart. To perform Bluetooth communication between the terminal apparatuses, a user should directly perform pairing for Bluetooth communication between the terminal apparatuses.

However, some users are not familiar with how to configure their terminal apparatuses. For example, elderly and/or child users of mobile Bluetooth communication apparatuses, may not be not familiar with how to configure a pairing setting for Bluetooth communication between terminal apparatuses. In addition, the users cannot perform Bluetooth communication between the terminal apparatuses due to lack of knowledge for Bluetooth communication, and thus users do not use Bluetooth devices with their own terminal apparatuses.

In addition, even when the users are familiar a pairing setting method for Bluetooth communication between terminal apparatuses, users may not correctly select their desired terminals among peripheral terminals searched through their own terminal apparatuses or users may input a wrong personal identification number (PIN) code and fail to perform pairing with their selected terminals. Therefore, there exists a problem among users that are not familiar with a pairing setting method or input wrong information for pairing setting that a lot of time and effort is spent configuring the settings for pairing for Bluetooth communication between the terminal apparatuses.

SUMMARY

One or more exemplary embodiments address the above disadvantages and other disadvantages not described above. However, it is understood that one or more exemplary embodiments are not required to overcome the disadvantages described above, and may not overcome any of the problems described above.

One or more exemplary embodiments relate to automatically perform pairing for wireless communication between a terminal apparatus capable of performing infrared (IR) communication and wireless communication and a remote control apparatus without a separate manipulation.

According to an aspect of an exemplary embodiment, a terminal apparatus includes: an IR receiving unit configured to receive an IR signal including first identification information of an external apparatus from the external apparatus; a radio frequency (RF) communication unit configured to perform wireless communication with the external apparatus which transmits the IR signal including the first identification information; a storage unit configured to store a pairing list including identification information of at least one external apparatus; and a control unit configured to control the RF communication unit to perform pairing for wireless communication with the external apparatus according to whether or not identification information of at least one external apparatus in the pairing list corresponds to the received first identification information.

The control unit may include a communication control unit configured to control the RF communication unit to perform reconnection with the external apparatus corresponding to the received first identification information when the received first identification information corresponds to identification information of at least one external apparatus in the pairing list.

The control unit may further include a peripheral apparatus searching unit configured to transmit an identification information request message for searching wirelessly communicable peripheral external apparatuses when the received first identification information does not correspond to identification information of at least one external apparatus in the pairing list and an identification information checking unit configured to check whether or not identification information included in a response message received from the searched external apparatus corresponds to the first identification information received from the external apparatus. The communication control unit may control the RF communication unit to perform the pairing when the first identification information corresponds to the second identification information.

The response message may include pairing setting information and the communication control unit may control the RF communication unit to perform the pairing according to the pairing setting information.

The control unit may further include a user command executing unit configured to execute an operation of the terminal apparatus related to received user command information when the user command information is received from the paired external apparatus through the RF communication unit in a radio frequency (RF) communication manner other than an IR communication manner.

The control unit may further include a power control unit configured to control a power of the terminal apparatus to turn on according to the IR signal received from the external apparatus through the IR receiving unit.

The first identification information may be Bluetooth address information of the external apparatus.

According to an aspect of another exemplary embodiment, a remote control apparatus which controls an operation of a terminal apparatus includes: an IR transmitting unit configured to transmit an IR signal including identification information of the remote control apparatus to a terminal apparatus; an RF communication unit configured to perform pairing or reconnection for wireless communication with the terminal apparatus when request information for reconnection or pairing from the terminal apparatus is received; and a control unit configured to perform communication with the terminal apparatus using the RF communication unit when the pairing or reconnection is performed.

The remote control apparatus may further include a storage unit configured to store pairing history information. The control unit may include a pairing history updating unit configured to store pairing history information of the remote control apparatus paired with the terminal apparatus in the storage unit when the remote control apparatus is paired with the terminal apparatus.

The control unit may control the IR transmitting unit to transmit the IR signal including the identification information to the terminal apparatus with reference to the pairing history information according to whether the pairing performing history of the remote control apparatus with the terminal apparatus is present in the pairing performing history information.

The control unit may, when an identification information request message is received from at least one other terminal apparatus through the RF communication unit, control the RF communication unit to transmit a response message including the identification information from the at least one other terminal apparatus.

The response message may include pairing setting information used in a pairing setting procedure with the terminal apparatus.

The IR signal may include a command for controlling a power of the terminal apparatus to turn on.

According to an aspect of another exemplary embodiment, a method of performing pairing for wireless communication with an external apparatus in a terminal apparatus includes: receiving a second IR signal including first identification information of an external apparatus from the external apparatus; checking whether or not pairing list information corresponding to the received first identification information corresponds to identification information of at least one external apparatus in the a pairing list that is stored in a storage unit; and performing reconnection with the external apparatus corresponding to the first identification information when the identification information of the at least one external apparatus in the pairing list corresponds to the received first identification information.

The method may further include controlling a power of the terminal apparatus to turn on according to a first IR signal received before the second IR signal including the first identification information.

The method may further include transmitting an identification information request message for searching wirelessly communicable peripheral external apparatuses when the identification information of the at least one external apparatus in the pairing list information does not correspond to the received first identification information; receiving a response message corresponding to the identification information request message from an external apparatus which receives the identification information request message; checking whether or not second identification information included in the received response message corresponds to the first identification information received from the external apparatus; and in response to the second identification information included in the received response message which corresponds to the first identification information received from the external apparatus, performing pairing with the external apparatus that corresponds to the first identification information by using pairing setting information included in the response message.

The method may further include: when user command information is received from the paired external apparatus in a RF communication manner other than the IR communication manner, executing an operation of a terminal apparatus related to the received user command information.

The first identification information may be Bluetooth address information of the external apparatus.

According to an aspect of another exemplary embodiment, a method of performing pairing for RF communication with a terminal apparatus in a remote control apparatus includes: transmitting an IR signal including identification information of a remote control apparatus to a terminal apparatus; performing pairing or reconnection with the terminal apparatus when request information for pairing or reconnection is received from the terminal apparatus in response to the transmitting an infrared (IR) signal including identification information of a remote control apparatus to a terminal apparatus; and performing RF communication with the terminal apparatus when the pairing or reconnection is performed.

The method may further include storing pairing history information of the remote control apparatus paired with the terminal apparatus in a storage unit when the remote control apparatus is paired with the terminal apparatus.

The transmitting the IR signal to the terminal apparatus may include transmitting the IR signal including the identification information of the remote control apparatus to the terminal apparatus with reference to the pairing history information when the pairing performing history of the remote control apparatus with the terminal apparatus is present in the storage unit.

The method may further include transmitting a response message including the identification information to the terminal in response to an identification information request message being received from the terminal apparatus in a RF communication manner.

The response message may include pairing setting information used in a pairing setting procedure with the terminal apparatus.

The IR signal may include a command for controlling a power of the terminal apparatus to turn on.

The identification information may be Bluetooth address information.

Accordingly, a terminal apparatus for auto pairing and a remote control apparatus and method thereof can automatically perform pairing for RF communication between a terminal apparatus which can perform IR communication and RF communication such as Bluetooth and the remote control apparatus without separate manipulations. Therefore, a process of selecting an apparatus to be paired, inputting a PIN code, and the like can be omitted so that a pairing time between apparatuses can be shortened. In addition, users who are not familiar with a pairing setting method can use RF communication such as Bluetooth with ease and convenience.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
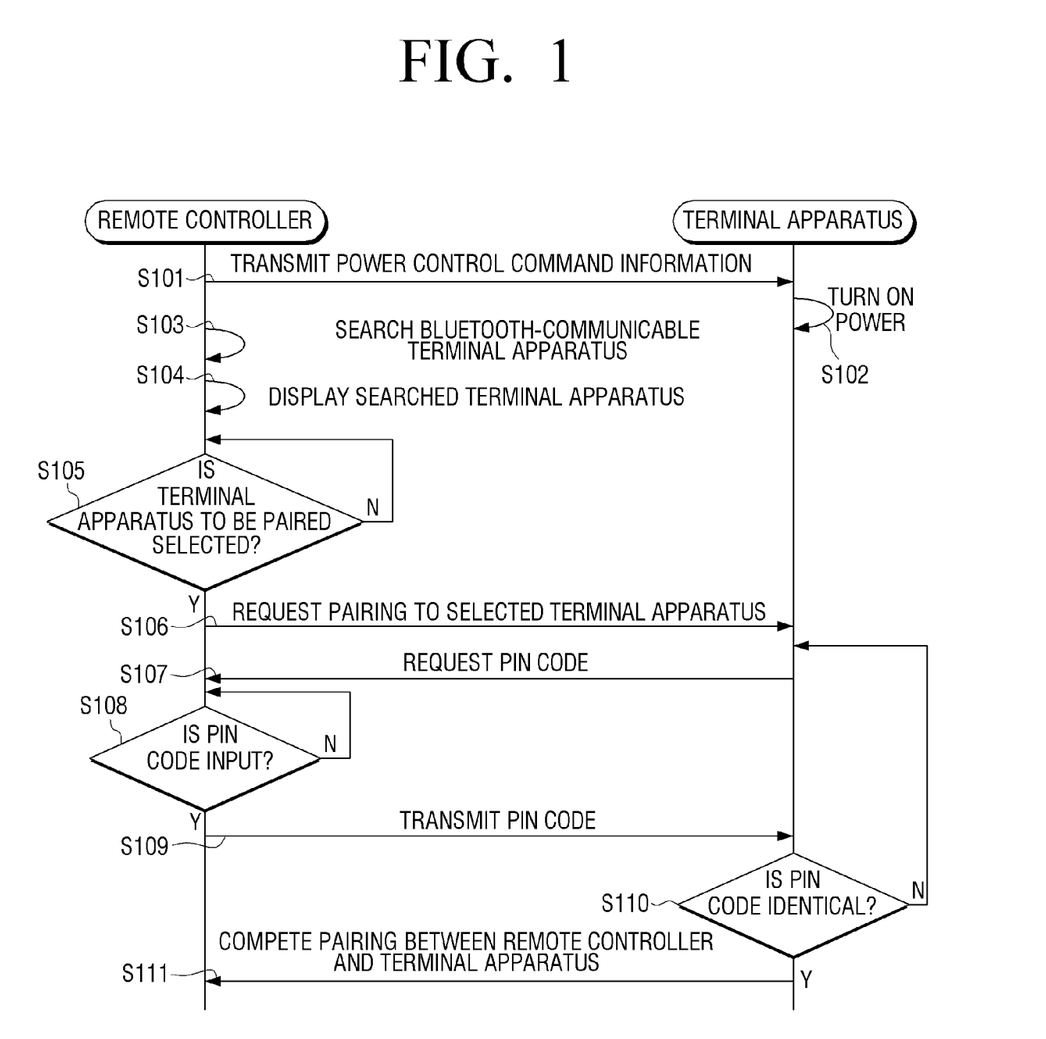
FIG. 1 is a sequence diagram illustrating a general pairing method for Bluetooth communication between terminal apparatuses.

FIG. 1 is a sequence diagram illustrating a general pairing method for Bluetooth communication between terminal apparatuses.

Referring to FIG. 1, the following procedure may be performed to pair terminal apparatuses which can perform IR communication so that Bluetooth communication may be used between the terminal apparatuses. First, according to a power control command of a user, a first terminal apparatus (hereinafter, referred to as a remote controller) transmits power control command information to a second side terminal apparatus through an IR transmitting unit (S101). Here, the terminal apparatus which receives the power control command information through the IR transmitting unit of the remote controller is a terminal apparatus which can receive IR and may be a display apparatus such as a television.

The terminal apparatus receives the power control command information and controls a power thereof to turn on according to the received power control command information (S102). Further, the remote controller which transmits the power control command information through the IR transmitting unit to the terminal apparatus searches peripheral terminal apparatuses which can perform Bluetooth communication in a predetermined range around the remote controller (S103). When the peripheral terminal apparatuses are searched, the remote controller displays a list of the searched peripheral terminal apparatuses on a screen (S104). Next, the remote controller receives selection command information of one of the peripheral terminal apparatuses displayed on the screen from the user (S105). Here, the peripheral terminal apparatus selected by the user may be the terminal apparatus which first transmits the power control command information through the IR transmitting unit.

When the selection command information for the terminal apparatus, which transmits the power control command information among the peripheral terminal apparatuses displayed on the screen, is received, the remote controller requests pairing to a corresponding terminal apparatus (S106). The terminal apparatus, which receives pairing request information from the remote controller, transmits PIN code request information to the remote controller to perform pairing with the remote controller (S107). Accordingly, the remote controller receives a PIN code from the user and transmits the received PIN code to the terminal apparatus which transmits the PIN code request information (S108, S109). The terminal apparatus which receives the PIN code from the remote controller checks whether or not its own PIN code stored therein is identical with the received PIN code (S110). When it is determined that the received PIN code is not identical with its own PIN code in step S110, the terminal apparatus requests a PIN code to the remote controller again. When it is determined that the received PIN code is identical with its own PIN code in step S110, the terminal apparatus performs pairing with the remote controller. Therefore, the pairing between the terminal apparatus and the remote controller is completed (S111) so that Bluetooth communication between the remote controller and the terminal apparatus becomes possible. In the pairing setting method in the related art, the case where the user does not select the terminal which receives the power control command information, but selects another peripheral terminal apparatus in step (S105), or the case where a PIN code is wrongly input and thus the pairing between the remote controller and the terminal apparatus should be performed again often occurs.

In other words, in the pairing setting method between the terminal apparatuses in the related art, when the user is not familiar with the pairing setting method for Bluetooth communication or the user inputs wrong information in a pairing setting procedure, the pairing setting should be performed again and thus there is a lot of time and difficulty in setting the pairing for Bluetooth communication between the terminal apparatuses.

Until now, the pairing setting method for Bluetooth communication between the terminal apparatuses in the related art has been described. Hereinafter, a pairing setting method between terminal apparatuses according to an exemplary embodiment will be described in detail with reference to FIGS. 2 to 6.

Figure 2:
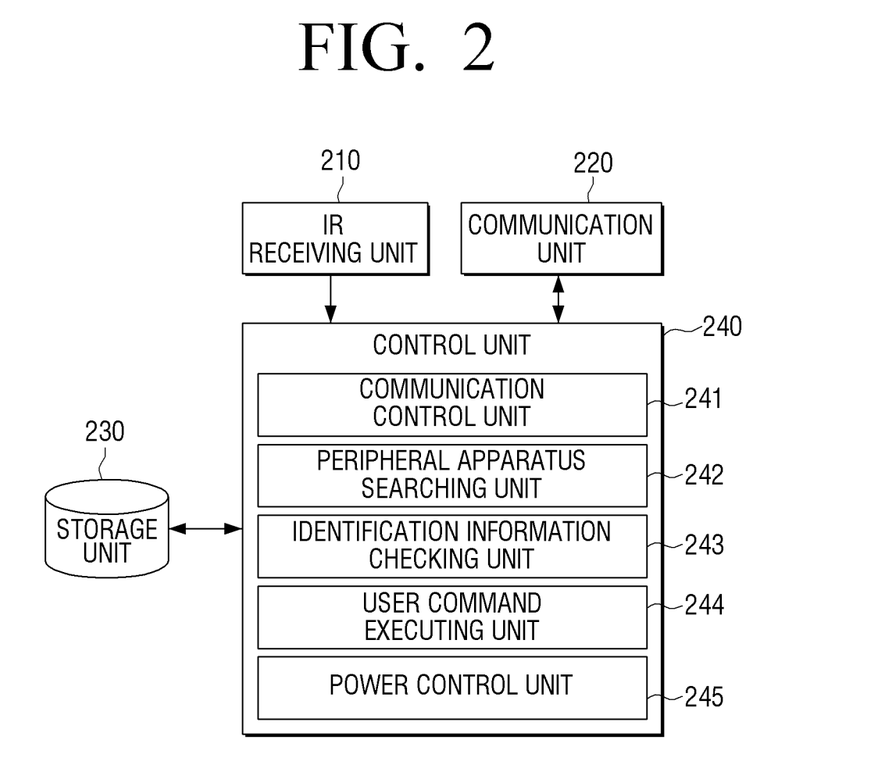
FIG. 2 is a block diagram illustrating a terminal apparatus which performs pairing or reconnection for wireless communication with an external apparatus according to an exemplary embodiment.

FIG. 2 is a block diagram of a terminal apparatus which performs pairing or reconnection for wireless communication with an external apparatus according to an exemplary embodiment.

As shown in FIG. 2, the terminal apparatus includes an IR receiving unit 210, a communication unit 220, a storage unit 230, and a control unit 240.

The IR receiving unit 210 receives an IR signal including first identification information of a wirelessly communicable external apparatus from the external apparatus. Here, terminal apparatus is a terminal apparatus which can perform radio frequency (RF) communication such as Bluetooth and IR communication and for example, may be a display apparatus. However, the inventive concept is not limited thereto and the terminal apparatus may perform data communication with an external apparatus in a wireless fidelity (Wi-Fi), short-distance communication such as near field communication (NFC), or an IR communication manner. The external apparatus is an apparatus which can perform RF communication or IR communication like the terminal apparatus and for example, may be a remote controller. The first identification information may be address information related to wireless communication of the external apparatus and according to an exemplary embodiment, the first identification information may be Bluetooth address (BD).

When the IR signal including the first identification information of the external apparatus is received from the IR receiving unit 210, the communication unit 220 performs RF communication with the external apparatus which transmits the IR signal according to a control command of the control unit 240.

The control unit 240 controls the communication unit 220 to perform pairing for RF communication with a corresponding external apparatus according to whether or not a pairing list related to the first identification information received from the external apparatus through the IR receiving unit 210 is stored. The control unit 240 may accomplish the pairing through a communication control unit 241. Specifically, the communication unit 241 checks whether or not the first identification information included in the IR signal is pre-stored in the storage unit 230 with reference to the pairing list including identification information of a plurality of external apparatuses stored in the storage unit 230.

When it is determined from a checking result that the first identification information is stored in the storage unit 230, the communication control unit 241 controls the communication unit 220 to perform reconnection with the external apparatus which transmits the IR signal using the pairing list for the first identification information stored in the storage unit 230. When it is determined from the checking result that the first identification information is not stored in the storage unit 230, the control unit 240 may control to search the peripheral external apparatuses and to automatically perform pairing with the external apparatus which transmits the IR signal including the first identification information. The control unit 240 may accomplish the above-described operation through a peripheral apparatus searching unit 242 and an identification information checking unit 243.

The peripheral apparatus searching unit 242 transmits an identification information request message for searching external apparatuses which can perform RF communication through the communication unit 220 around the terminal apparatus when the first identification information included in the IR signal is not stored in the storage unit 230. According to exemplary embodiments, to search a peripheral external apparatus which can perform RF communication with the terminal apparatus, the peripheral apparatus searching unit 242 transmits an inquiry message which is the identification information request information to the peripheral external apparatus in a broadcasting manner through the communication unit 220. The external apparatus which receives the identification information request message transmits a response message to the terminal apparatus which transmits the identification information request message in an RF communication manner. According to exemplary embodiments, the peripheral external apparatus which receives the identification information request message may transmit the response message in a Bluetooth communication manner.

Here, the response message may include second identification information of the external apparatus and pairing setting information. According to an aspect of an exemplary embodiment, the second identification information included in the response message may be BD_ADDR and the pairing setting information may be Num_responses, Page_Scan_Repetiotion_Mode, Reserved, Class_of_Device, Clock_Offset, or RSS.

When the response message is received from the peripheral external apparatus, the identification information checking unit 243 checks whether or not the second identification information included in the received response message corresponds to the first identification information of the external apparatus which transmitted the IR signal. When the response message with second identification information is corresponds with the first identification information according to a checking result, the peripheral apparatus searching unit 242 completes an operation of searching the peripheral external apparatuses. Simultaneously, the communication unit 241 controls the communication unit 220 to allow the terminal apparatus to be paired with the external apparatus which transmits the IR signal using the pairing setting information included in the response message which corresponds to the first identification information received from the external apparatus through the identification information checking unit 243. Therefore, the communication unit 220 performs the pairing with the external apparatus which transmits the IR signal using the pairing setting information included in the response message.

Additionally, the communication unit 241 stores the second identification information and the pairing setting information included in the response message which corresponds to the first identification information in the storage unit 230. Therefore, when an IR signal is received from a corresponding external apparatus at a later time, the communication control unit 241 may control the communication unit 220 to allow the terminal apparatus be reconnected to the corresponding external apparatus without searching peripheral external apparatuses.

According to another aspect of an exemplary embodiment, the control unit 240 includes a power control unit 245. The power control unit 245 controls the power of the terminal apparatus to turn on according to the IR signal received from the external apparatus through the IR receiving unit 210. Specifically, before the external apparatus transmits the IR signal including the first identification information to the terminal apparatus, the external apparatus transmits the IR signal for the power control command to turn on the power of the terminal apparatus. Thereby, the power control unit 245 controls the power of the terminal apparatus to turn on according to the IR signal for the power control command received through the IR receiving unit 210.

Thus, when the IR signal including the first identification information of a corresponding external apparatus is received from the corresponding external apparatus at a state that the power of the terminal apparatus turns on as described above, the terminal apparatus performs the pairing for RF communication with the external apparatus which transmits the IR signal including the first identification information.

According to another aspect of an exemplary embodiment, the control unit 240 includes a user command executing unit 244. Specifically, user command information is received from the external apparatus through the communication unit 220 in an RF communication manner such as Bluetooth; the user command executing unit 244 executes an operation of the terminal apparatus related to the received user command information.

Until now, the operation for each component of the terminal apparatus which automatically performs the pairing or reconnection for RF communication with the external apparatus has been described in detail. Hereinafter, each component of a remote control apparatus which controls an operation of the terminal apparatus will be described in detail.

Figure 3:
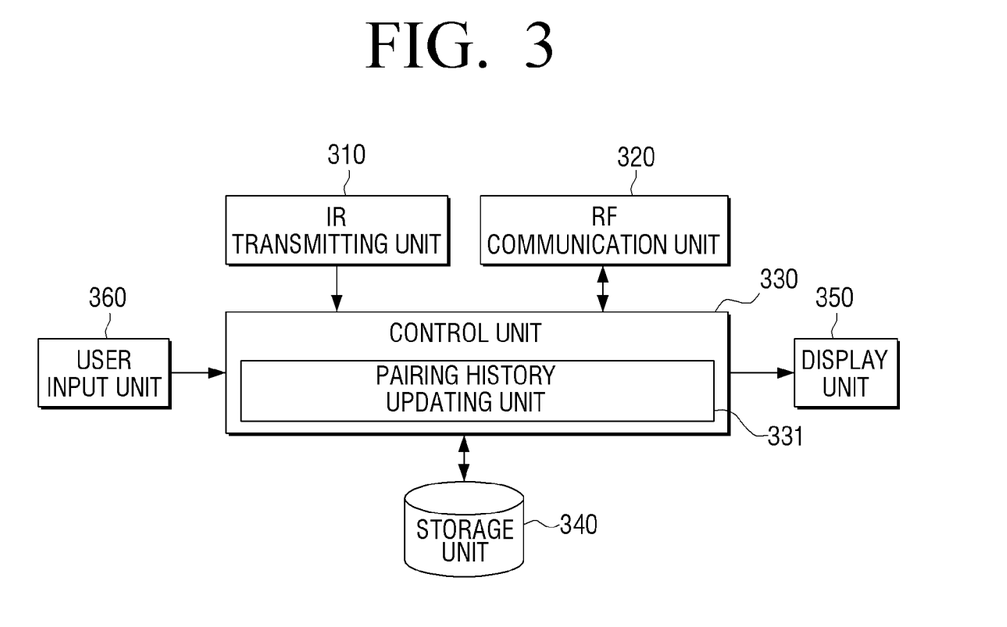
FIG. 3 is a block diagram illustrating a remote control apparatus which controls an operation of a terminal apparatus according to an exemplary embodiment.

FIG. 3 is a block diagram of a remote control apparatus which controls an operation of a terminal apparatus according to an exemplary embodiment.

As shown in FIG. 3, the remote control apparatus is a control apparatus configured to control an operation of the terminal apparatus and may be, for example, a remote controller. The remote control apparatus includes an IR transmitting unit 310, an RF communication unit 320, and a control unit 330. The IR transmitting unit 310 transmits an IR signal including identification information of the remote control apparatus to the terminal apparatus. When request information for reconnection or pairing is received from the terminal apparatus, the RF communication unit 320 performs pairing or reconnection for RF communication such as Bluetooth with a corresponding terminal apparatus. That is, when the pairing request information is received from the terminal apparatus, the RF communication unit 320 performs the pairing with the terminal apparatus which transmits the pairing request information. Further, when the reconnection request information is received from the terminal apparatus, the RF communication unit 320 performs the reconnection for RF communication with the terminal apparatus which transmits the reconnection request information.

When the pairing with a corresponding terminal apparatus is performed, the control unit 330 controls the remote control apparatus to perform wireless communication with the paired terminal apparatus through the RF communication unit 320.

The identification information transmitted to the terminal apparatus through the IR transmitting unit 310 may be Bluetooth address information. According to an exemplary embodiment, operation command information including power control command information is received from a user through a user input unit 360, the control unit 330 checks whether or not pairing performing history with the terminal apparatus, which transmits the IR signal including operation command information, is present with reference to pre-stored paring history information with a plurality of terminal apparatuses. When it is determined from a checking that the pairing performing history with a corresponding terminal apparatus is not present, the control unit 330 controls the IR transmitting unit 310 to transmit the operation command information according to a user's command and the IR signal including the identification information of the remote control apparatus. Thus, the IR transmitting unit may transmit the operation command information according to the user's command and the IR signal including the identification information of the remote control apparatus to the corresponding terminal apparatus.

According to another aspect of an exemplary embodiment, the IR transmitting unit 310 may transmit the IR signal including identification information of the remote control apparatus to the terminal apparatus after a point of time when the power control command information is input from a user through the user input unit 360. Specifically, when the power control command information is input from the user through the user input unit 360, the IR transmitting unit 310 transmits the IR signal for the power control command information to the terminal apparatus. Then, the IR transmitting unit 310 may transmit the IR signal including the identification information of the remote control apparatus to the terminal apparatus.

According to another aspect of an exemplary embodiment, when power control command information is input from the user through the user input unit 360, the IR transmitting unit 310 may transmit the power control command information and the IR signal including the identification information of the remote control apparatus to the terminal apparatus.

The control unit 330 configured to control the remote control apparatus to perform RF communication with the paired terminal apparatus through the RF communication unit 320 include a pairing history updating unit 331. When the pairing with a corresponding terminal apparatus is made, the pairing history updating unit 331 updates pairing history information for pairing with the corresponding terminal apparatus in a storage unit 340. Here, the storage unit 340 stores the pairing history information paired for RF communication with at least one terminal apparatus. Therefore, when the pairing with the terminal is made, the pairing history updating unit 331 adds and stores pairing history information of a corresponding terminal apparatus stored in the storage unit 340.

Further, when an inquiry message which is a broadcasted identification information request message, that is received from at least one other terminal apparatus among other peripheral terminal apparatuses through the RF communication unit 320, the control unit 330 controls the RF communication unit 320 to transmit a response message to the other terminal apparatus which transmits the inquiry message as the identification information request message. Thereby, the RF communication unit 320 transmits the response message including identification information of a remote control apparatus and pairing setting information used in a pairing setting procedure with the terminal apparatus to the terminal apparatus which transmits the inquiry message as the identification information request message. According to an aspect of an exemplary embodiment, the identification information included in the response message may be BD_ADDR. The pairing setting information may be Num_responses, Page_Scan_Repetiotion_Mode, Reserved, Class_of_Device, Clock_Offset, or RSS.

The remote control apparatus according to an aspect of an exemplary embodiment performs pairing or reconnection for RF communication with a corresponding terminal apparatus according to the request information for pairing or reconnection received from the terminal apparatus so that the pairing or reconnection for RF communication with a corresponding apparatuses is performed and thus the pairing or reconnection between the apparatuses can be made rapidly and accurately.

When user command information is input through the user input unit 360 at a state that the pairing between the remote control apparatus and the terminal apparatus is made, the remote control apparatus transmits control command information related to the input user command information to the terminal apparatus through the RF communication unit 320. Therefore, the terminal apparatus which receives the control command information may perform an operation corresponding to the received control command information. For example, when the user cannot watch an image displayed in the terminal apparatus, the user requests an image being displayed in the terminal apparatus through the remote control apparatus. When the image signal request information is input, the remote control apparatus transmits the received image signal request information through RF communication such as Bluetooth to the terminal apparatus. The terminal apparatus which receives the image signal request information from the remote control apparatus transmits an image signal for the requested image to the remote control apparatus. Therefore, the remote control apparatus displays an image related to the image signal received from the terminal apparatus on a screen through a display unit 350 so that the user can use the image displayed in the terminal apparatus through the remote control apparatus.

Until now, the operation of each component of the terminal apparatus and the remote control apparatus which perform pairing for RF communication such as Bluetooth has been described in detail. Hereinafter, a method of performing pairing or reconnection for RF communication with an external apparatus in a terminal apparatus will be described in detail.

Figure 4:
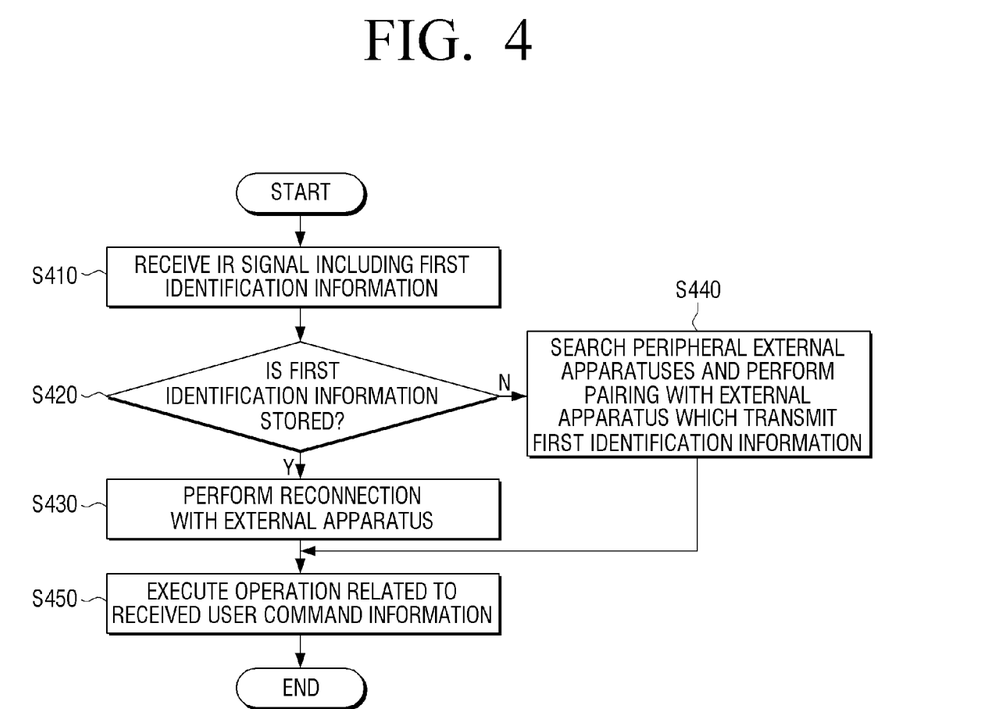
FIG. 4 is a flowchart illustrating a method of performing pairing or reconnection for RF communication with an external apparatus in a terminal apparatus according to an exemplary embodiment.

FIG. 4 is a flowchart illustrating a method of performing pairing or reconnection for RF communication with an external apparatus in a terminal apparatus.

As shown in FIG. 4, a terminal apparatus receives an IR signal including first identification information of an external apparatus from the external apparatus (S410).

Here, the terminal apparatus is a terminal apparatus which can perform RF communication such as Bluetooth and IR communication. The external apparatus is an apparatus which can perform RF communication and IR communication like the terminal apparatus and for example, may be a remote controller.

The first identification information of the external apparatus is address information related to NFC of the external apparatus and according to an aspect of an exemplary embodiment, the first identification information may be Bluetooth address information. Before the terminal apparatus receives the IR signal including the first identification information of the external apparatus, the terminal apparatus receives an IR signal for a power control command from a corresponding external apparatus. Thereby, the terminal apparatus controls the power of the terminal apparatus to turn on according to the received IR signal for the power control command. However, the exemplary embodiments are not limited thereto and the terminal apparatus may receive an IR signal including first identification information of an external apparatus and power control command information from the external apparatus.

The terminal apparatus in which the power turns on according to the IR signal for the power control command information checks whether or not the first identification information of the external apparatus is stored in a storage unit (S420). Here, the storage unit stores a pairing list including identification information of a plurality of paired external apparatuses. Therefore, the terminal apparatus checks whether or not a pairing list related to the first identification information of the external apparatus with reference to the pairing list stored in the storage unit and generates a checking result.

When it is determined from the checking result that the pairing list related to the first identification information of the external apparatus is stored in the storage unit, the terminal apparatus performs reconnection for RF communication using the pairing list related to the first identification information without pairing with the external apparatus which transmits the IR signal including the first identification information (S430). Further, when it is determined from the checking result that the first identification information included in the power control command information is not stored in the storage unit, the terminal apparatus searches peripheral external apparatuses and performs pairing with the external apparatus which transmits the first identification information of the external apparatus (S440). A method of searching the peripheral external apparatuses and recognizing the external apparatus which transmits the power control command information by the terminal apparatus will be described in detail with reference to FIG. 5.

Figure 5:
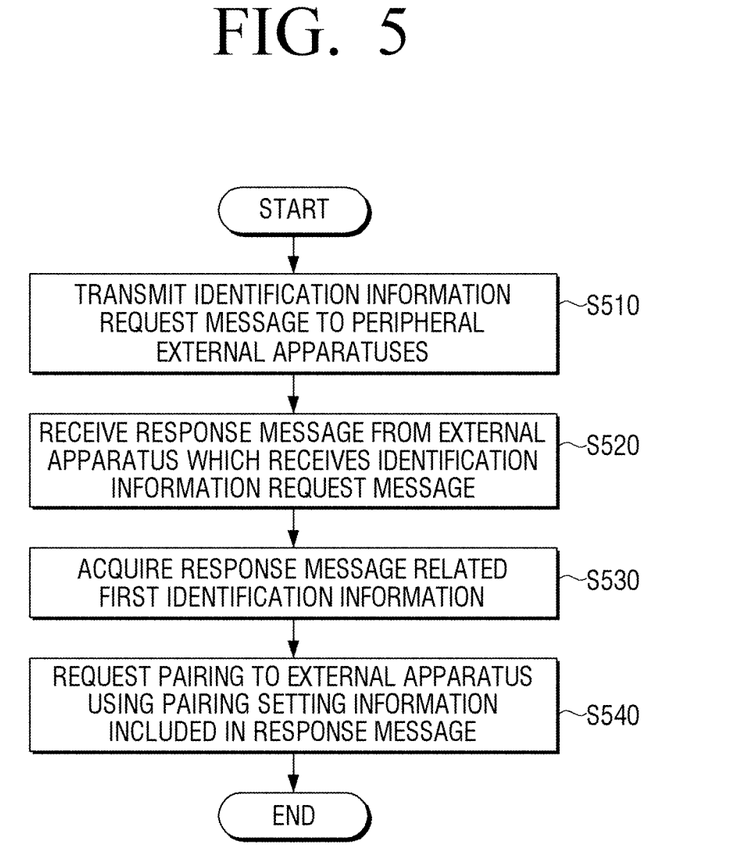
FIG. 5 is a flowchart illustrating a method of searching a peripheral external apparatus and recognizing an external apparatus which transmits an IR signal in a terminal apparatus according to an exemplary embodiment.

FIG. 5 is a flowchart illustrating a method of searching peripheral external apparatuses and recognizing an external apparatus which transmits an IR signal in a terminal apparatus.

As shown in FIG. 5, when it is determined that first identification information of an external apparatus is not stored in a storage unit, the terminal apparatus, which transmits an identification information request message to search a peripheral external apparatus that can perform RF communication in a preset range, in a broadcasting manner to peripheral apparatuses (S510). According to an aspect of an exemplary embodiment, the terminal apparatus transmits an inquiry message as an identification information request message to the peripheral external apparatuses in a broadcasting manner to search the peripheral external apparatuses which can perform RF communication. However, the exemplary embodiments are not limited thereto and the terminal apparatus may transmit the inquiry message as the identification information request message to the peripheral external apparatuses to search the peripheral external apparatus which can perform RF communication in another manner other than the broadcasting manner.

Then, the terminal apparatus receives a response message related to the identification information request message from a peripheral external apparatus which receives the identification information request message (S520). Here, the response message may include second identification information of the external apparatus and pairing setting information. When the response message is received, the terminal apparatus checks whether or not the second identification information included in the received response message corresponds to the first identification information included in the IR signal and acquires a response message related to the first identification information (S530). When the response message is acquired, the terminal apparatus completes the search for the peripheral external apparatuses and simultaneously requests pairing to the external apparatus which transmits the IR signal using the pairing setting information included in the acquired response message (S540). Next, the terminal apparatus stores the first identification information of the external apparatus which transmits the IR signal and the pairing setting information in the storage unit.

At a state that the pairing with a corresponding external apparatus is made according to reconnection with the external apparatus which transmits the IR signal including the first identification information or pairing with a corresponding external apparatus according to pairing setting as described above, when user command information is received according to a user's command in an RF communication manner from the paired external apparatus, the terminal apparatus executes an operation of the terminal apparatus related to the received user command information (S450). For example, when image signal request information related to an image displayed on a screen of the current terminal apparatus is received from the paired external apparatus through RF communication, the terminal apparatus may transmit the image information related to the received image signal request information to the external apparatus. Therefore, the user can watch the image displayed in the terminal apparatus through the external apparatus.

Until now, the method of performing pairing with the external apparatus for RF communication with the external apparatus in the terminal apparatus has been described in detail. Hereinafter, a method of performing pairing for RF communication with a terminal apparatus by a remote control apparatus according to an exemplary embodiment will be described in detail.

Figure 6:
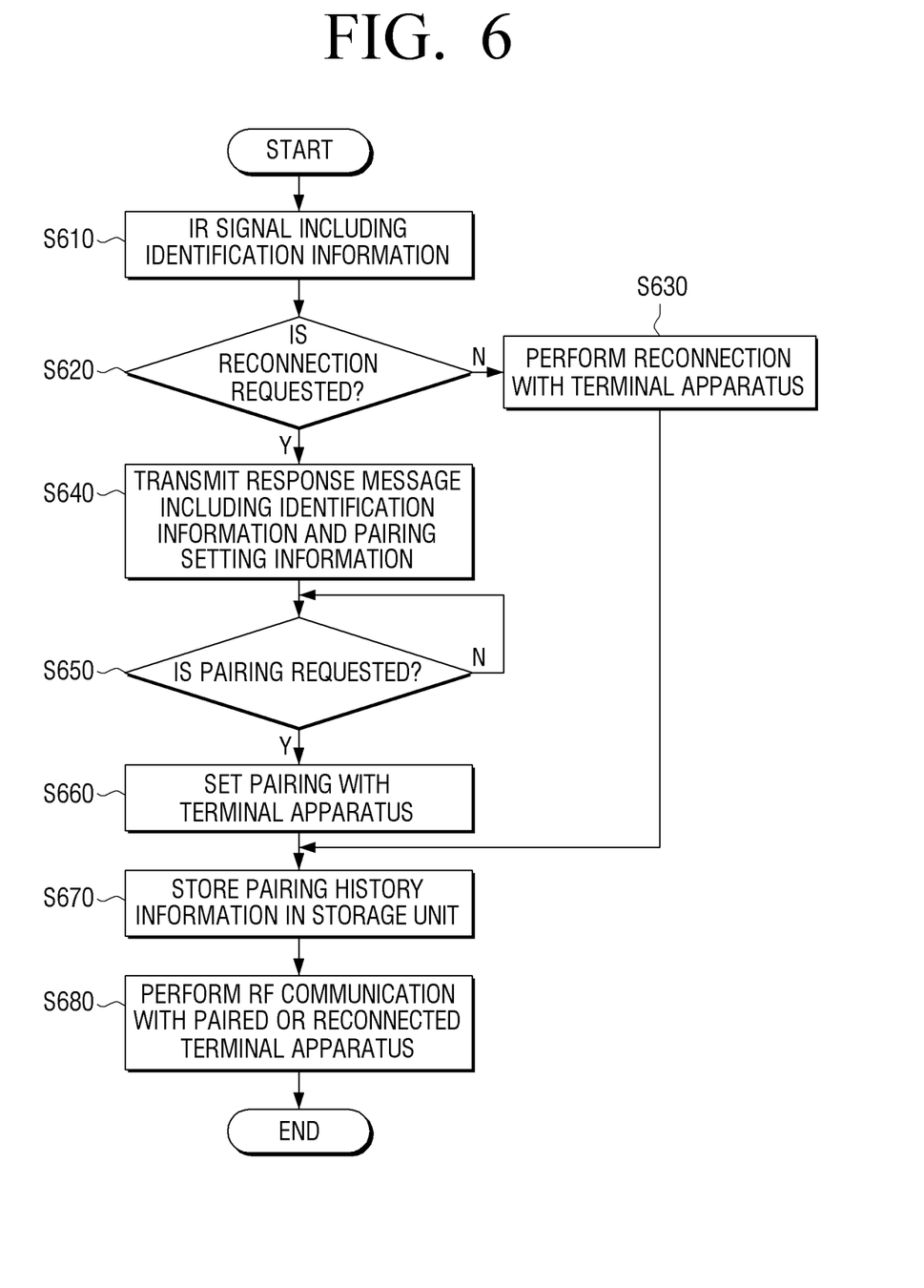
FIG. 6 is a flowchart illustrating a method of performing RF communication with a terminal apparatus in a remote control apparatus according to an exemplary embodiment.

FIG. 6 is a flowchart illustrating a method of performing RF communication with a terminal apparatus in a remote control apparatus according to an exemplary embodiment.

As shown in FIG. 6, the remote control apparatus is an apparatus configured to control an operation of the terminal apparatus and for example, may be an IR remote controller. When one of input buttons such as a power input button is pressed by a user, the remote control apparatus determines whether or not pairing performing history with the terminal apparatus is present with reference to pre-stored pairing history information. When it is determined that the pairing performing history is not present, the remote control apparatus transmit an IR signal including operation command information related to the input button pressed by the user and identification information of the remote control apparatus (S610). Here, the identification information may be Bluetooth address information.

Alternatively, when the power input button is pressed by the user, the remote control apparatus may transmits an IR signal including identification information of the remote control apparatus without performing separate searching on the pairing performing history. According to an exemplary embodiment, when the power input button is pressed by the user, the remote control apparatus may transmit an IR signal including the power control command information related to the power input button and the identification information of the remote control apparatus. Here, the power control command information is information for controlling the power of the terminal apparatus to turn on.

According to another exemplary embodiment, when the power control command is input, the remote control apparatus may transmit an IR signal for the power control command to the terminal apparatus and then transmit an IR signal including the identification information of the remote control apparatus.

Next, when reconnection request information for RF communication such as Bluetooth from the terminal apparatus which transmits the identification information is received, the remote control apparatus performs only reconnection with the corresponding terminal apparatus without pairing and thus RF communication with the terminal apparatus restarts (S620 and S630). Further, when a broadcasted identification information request message is received in at least one other terminal apparatus, the remote control apparatus which transmits the IR signal including the identification information transmits a response message including identification information of the remote control apparatus and pairing setting information used in a pairing setting procedure with the terminal apparatus to the terminal apparatus which transmits the identification information request message through RF communication (S640). When pairing request information is received from the terminal apparatus which transmits the response message, the remote control apparatus sets pairing with a corresponding terminal apparatus (S650 and S660). Therefore, the pairing for RF communication between the remote control apparatus and the terminal apparatus is automatically set.

When the pairing with the terminal apparatus which transmits the request information for reconnection or pairing is made, the remote control apparatus stores pairing history information related to the pairing with the corresponding terminal apparatus in a storage unit (S670).

When the pairing or reconnection with the terminal apparatus which transmits the pairing request information is made, the remote control apparatus performs RF communication with the paired terminal apparatus (S680). Specifically, when user command information is input from a user, the remote control apparatus paired or reconnected with the terminal apparatus transmits control command information related to the user command information to the paired or reconnected terminal apparatus through RF communication. Therefore, the terminal apparatus which receives the control command information can perform an operation corresponding to the received control command information. For example, when the user cannot hear an audio signal having a small sound level output from the terminal apparatus, the user may request audio output from the current terminal apparatus through the remote control apparatus.

When the audio request information is input, the remote control apparatus transmits the audio request information input through RF communication to the terminal apparatus. The terminal apparatus which receives the audio request information from the remote control apparatus transmits an audio signal related to the audio requested through RF communication from the paired remote control apparatus. Therefore, the remote control apparatus outputs the audio signal received from the terminal apparatus through a speaker. Thereby, even when the user cannot hear the audio having a small sound level output from the terminal apparatus, the user can hear audio selected by the user through the remote control apparatus.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, while not required in all aspects, one or more units of the remote controller or terminal apparatus can include a processor or microprocessor executing a computer program stored in a computer-readable medium.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A terminal apparatus comprising:
   an infrared (IR) receiver configured to receive an IR signal including first identification information of an external apparatus from the external apparatus;
   a radio frequency (RF) communication unit configured to perform wireless communication with the external apparatus which transmits the IR signal including the first identification information;
   a storage unit configured to store a pairing list including identification information of at least one external apparatus; and
   a control unit configured to control the RF communication unit to perform pairing or reconnection for wireless communication with the external apparatus according to whether identification information of at least one external apparatus in the pairing list corresponds to the received first identification information, and
   wherein the control unit includes a peripheral apparatus searching unit configured to transmit an identification information request message for searching wirelessly communicable peripheral external apparatuses in response to the received first identification information not corresponding to identification information of at least one external apparatus in the pairing list.

2. The terminal apparatus as claimed in claim 1, wherein the control unit includes a communication control unit configured to control the RF communication unit to perform reconnection with the external apparatus corresponding to the received first identification information when the received first identification information corresponds to identification information of at least one external apparatus in the pairing list.

3. The terminal apparatus as claimed in claim 2, wherein the control unit further includes:
an identification information checking unit configured to check whether second identification information included in a response message received from the searched external apparatus corresponds to the first identification information received from the external apparatus,
wherein the communication control unit controls the RF communication unit to perform the pairing when the first identification information corresponds to the second identification information.

4. The terminal apparatus as claimed in claim 3, wherein the response message includes pairing setting information, the communication control unit controls the RF communication unit to perform the pairing according to the pairing setting information.

5. The terminal apparatus as claimed in claim 3, wherein the control unit further includes a user command executing unit configured to execute an operation of the terminal apparatus related to received user command information when the user command information is received from the paired external apparatus through the RF communication unit.

6. The terminal apparatus as claimed in claim 1, wherein the control unit further includes a power control unit configured to control a power of the terminal apparatus to turn on according to the IR signal received from the external apparatus through the IR receiving unit.

7. The terminal apparatus as claimed in claim 1, wherein the first identification information is Bluetooth address information of the external apparatus.

8. A remote control apparatus which controls an operation of a terminal apparatus, the remote control apparatus comprising:
an infrared (IR) transmitter configured to transmit an IR signal including identification information of the remote control apparatus to a terminal apparatus;
a radio frequency (RF) communication unit configured to perform pairing or reconnection for wireless communication with the terminal apparatus when request information for reconnection or pairing from the terminal apparatus is received; and
a control unit configured to perform communication with the terminal apparatus using the RF communication unit when the pairing or reconnection is performed;
wherein the control unit controls the IR transmitter to transmit the IR signal including the identification information to the terminal apparatus with reference to a pairing history information according to whether a pairing history of the remote control apparatus with the terminal apparatus is present in the pairing history information, and
wherein the control unit is configured to receive an identification information request message in response to the transmitted identification information not corresponding to the identification information of the remote control apparatus in the pairing list.

9. The remote control apparatus as claimed in claim 8, further comprising:
a storage unit configured to store the pairing history information,
wherein the control unit includes a pairing history updating unit configured to store the pairing history information of the remote control apparatus paired with the terminal apparatus in the storage unit when the remote control apparatus is paired with the terminal apparatus.

10. The remote control apparatus as claimed in claim 9, wherein the control unit controls the IR transmitting unit to transmit the IR signal including the identification information to the terminal apparatus with reference to the pairing history information according to whether the pairing performing history of the remote control apparatus with the terminal apparatus is present in the pairing performing history information.

11. The remote control apparatus as claimed in claim 8, wherein, when an identification information request message is received from the terminal apparatus through the RF communication unit, the control unit controls the RF communication unit to transmit a response message including the identification information from the terminal apparatus.

12. The remote control apparatus as claimed in claim 11, wherein the response message includes pairing setting information used in a pairing setting procedure with the terminal apparatus.

13. The remote control apparatus as claimed in claim 11, wherein the IR signal includes a command for controlling a power of the terminal apparatus to turn on.

14. A method of performing pairing for wireless communication with an external apparatus in a terminal apparatus, the method comprising:
receiving a first infrared (IR) signal including first identification information of an external apparatus from the external apparatus;
checking whether pairing list information corresponding to the received first identification information corresponds to identification information of at least one external apparatus in a pairing list that is stored in a storage unit; and
performing reconnection with the external apparatus corresponding to the first identification information when the identification information of the at least one external apparatus in the pairing list corresponds to the received first identification information; and
transmitting an identification information request message for searching wirelessly communicable peripheral external apparatuses in response to the identification information of the at least one external apparatus in the pairing list information corresponding to the received first identification information.

15. The method as claimed in claim 14, further comprising controlling a power of the terminal apparatus to turn on according to a second IR signal received before the first IR signal including the first identification information.

16. The method as claimed in claim 14, further comprising:
receiving a response message corresponding to the identification information request message from an external apparatus which receives the identification information request message;
checking whether second identification information included in the received response message corresponds to the first identification information received from the external apparatus; and
in response to the second identification information included in the received response message which corresponds to the first identification information received from the external apparatus, performing pairing with the external apparatus that corresponds to the first identification information by using pairing setting information included in the response message.

17. The method as claimed in claim 16, further comprising executing an operation of a terminal apparatus related to received user command information, when the user command information is received from the paired external apparatus in a radio frequency (RF) communication manner.

18. The method as claimed in claim 14, wherein the first identification information is Bluetooth address information of the external apparatus.

19. A method of performing pairing for radio frequency (RF) communication with a terminal apparatus in a remote control apparatus, the method comprising:
 transmitting an infrared (IR) signal including identification information of a remote control apparatus to a terminal apparatus;
 receiving an identification information request message in response to the transmitted identification information not corresponding to identification information of the remote control apparatus in a pairing list;
 performing pairing or reconnection with the terminal apparatus when request information for pairing or reconnection is received from the terminal apparatus in response to the transmitting an infrared (IR) signal including identification information of a remote control apparatus to a terminal apparatus; and
 performing radio frequency (RF) communication with the terminal apparatus in response to the pairing or reconnection being performed.

20. The method as claimed in claim 19, further comprising storing pairing history information of the remote control apparatus paired with the terminal apparatus in a storage unit when the remote control apparatus is paired with the terminal apparatus.

21. The method as claimed in claim 20, wherein the transmitting the IR signal to the terminal apparatus includes transmitting the IR signal including the identification information of the remote control apparatus to the terminal apparatus with reference to the pairing history information when pairing history of the remote control apparatus with the terminal apparatus is present in the storage unit.

22. The method as claimed in claim 19, further comprising:
 transmitting a response message including the identification information to the terminal in response to an identification information request message being received from the terminal apparatus in a RF communication manner.

23. The method as claimed in claim 22, wherein the response message includes pairing setting information used in a pairing setting procedure with the terminal apparatus.

24. The method as claimed in claim 22, wherein the IR signal includes a command for controlling a power of the terminal apparatus to turn on.

25. The method as claimed in claim 19, wherein the identification information is Bluetooth address information of a remote control apparatus.

26. A method of performing pairing for radio frequency (RF) communication with a terminal apparatus in a remote control apparatus, the method comprising:
 transmitting an infrared (IR) signal including remote control apparatus identification information to the terminal apparatus;
 receiving an identification information request message in response to the transmitted identification information not corresponding to the identification information of the remote control apparatus in a pairing list;
 receiving a request for pairing or reconnection from the terminal apparatus in response to the transmitting an IR signal including remote control apparatus identification information;
 pairing or reconnecting with the terminal apparatus in response to the receiving a request for pairing or reconnecting from the terminal apparatus; and
 performing radio frequency (RF) communication with the terminal apparatus when the pairing or reconnecting is performed.

27. A method of performing pairing for wireless communication with an external apparatus in a terminal apparatus, the method comprising:
 receiving an infrared (IR) signal including first external apparatus identification information from the external apparatus;
 determining whether pairing list information corresponding to the received first external apparatus identification information is present in a pairing list; and
 in response to determining first external apparatus identification information is present in the pairing list, performing reconnection or pairing using a radio frequency (RF) signal with the external apparatus corresponding to the first external apparatus identification information using the pairing list information; and
 in response to determining the first external apparatus identification information is not present in the pairing list, transmitting an RF signal identification information request message to search wirelessly communicable peripheral external apparatuses.

28. The method as claimed in claim 27, further comprising:
 receiving a response message including second external apparatus identification information from an external apparatus which receives the RF signal identification information request message;
 determining whether or not second external apparatus identification information corresponds to the first external apparatus identification information received from the external apparatus in the IR signal; and
 in response to determining the second external apparatus identification information included in the received response message, pairing with the external apparatus that corresponds to the first external apparatus identification information.

* * * * *